United States Patent
Shiota et al.

(10) Patent No.: US 7,289,820 B2
(45) Date of Patent: Oct. 30, 2007

(54) TIME-MATCHING SYSTEM AND TIME-MATCHING METHOD

(75) Inventors: Shinsuke Shiota, Kanagawa (JP); Yoshikazu Kobayashi, Kanagawa (JP)

(73) Assignee: NEC Infrontia Corporation (JP)

( * ) Notice: Subject to any disclaimer, the term of this patent is extended or adjusted under 35 U.S.C. 154(b) by 624 days.

(21) Appl. No.: 10/715,565

(22) Filed: Nov. 19, 2003

(65) Prior Publication Data
US 2004/0147272 A1 Jul. 29, 2004

(30) Foreign Application Priority Data
Nov. 28, 2002 (JP) ............................. 2002-345198

(51) Int. Cl.
*H04B 7/00* (2006.01)
*H04B 15/00* (2006.01)

(52) U.S. Cl. .................................... 455/502; 455/13.1

(58) Field of Classification Search ................ 455/502, 455/13.1
See application file for complete search history.

(56) References Cited

U.S. PATENT DOCUMENTS

| | | | | |
|---|---|---|---|---|
| 6,219,303 | B1* | 4/2001 | Morohoshi et al. | 368/47 |
| 6,542,754 | B1* | 4/2003 | Sayers et al. | 455/502 |
| 6,628,628 | B1* | 9/2003 | Yamazaki | 370/320 |
| 6,959,198 | B2* | 10/2005 | Mitsugi | 455/500 |
| 2003/0069033 | A1* | 4/2003 | Edge et al. | 455/502 |
| 2004/0192201 | A1* | 9/2004 | Febvre et al. | 455/13.2 |

FOREIGN PATENT DOCUMENTS

| | | |
|---|---|---|
| JP | 10-145845 | 5/1998 |
| JP | 2000-278746 | 10/2000 |
| JP | 2000-314771 | 11/2000 |
| JP | 2000-352591 | 12/2000 |
| JP | 2001-320373 | 11/2001 |
| JP | 2002-156477 | 5/2002 |
| JP | 2002-244937 | 8/2002 |

OTHER PUBLICATIONS

Japanese Office Action dated Apr. 28, 2005 (and English translation of relevant portion).

* cited by examiner

*Primary Examiner*—Edan Orgad
*Assistant Examiner*—Bobbak Safaipour
(74) *Attorney, Agent, or Firm*—Dickstein, Shapiro, LLP.

(57) ABSTRACT

A time-matching system includes a first terminal device and a communications relay device relaying communications between the first terminal device and a second terminal device on a wireless communications network. The first terminal device receives a GPS-data from a GPS satellite, executes a first correction procedure on a satellite time-data of the GPS data to generate a first time-data, and transmits the first time-data to the communications relay device. The communications relay device receives the first time-data, executes an intermediate correction procedure on the first time-data to generate an intermediate time-data, and transmits the intermediate time-data to the second terminal device. The first correction procedure is based on a time delay in communications between the GPS satellite and the first terminal device. The intermediate correction procedure is based on a time delay in communications between the first terminal device and the communications relay device.

11 Claims, 3 Drawing Sheets

Fig. 2

| RECEIVING TIME-DATA | MAC ADDRESS |
|---|---|
| PERMITTED | ADDRESS A1, ADDRESS A2, ⋯ |
| FORBIDDEN | ADDRESS B1, ADDRESS B2, ⋯ |

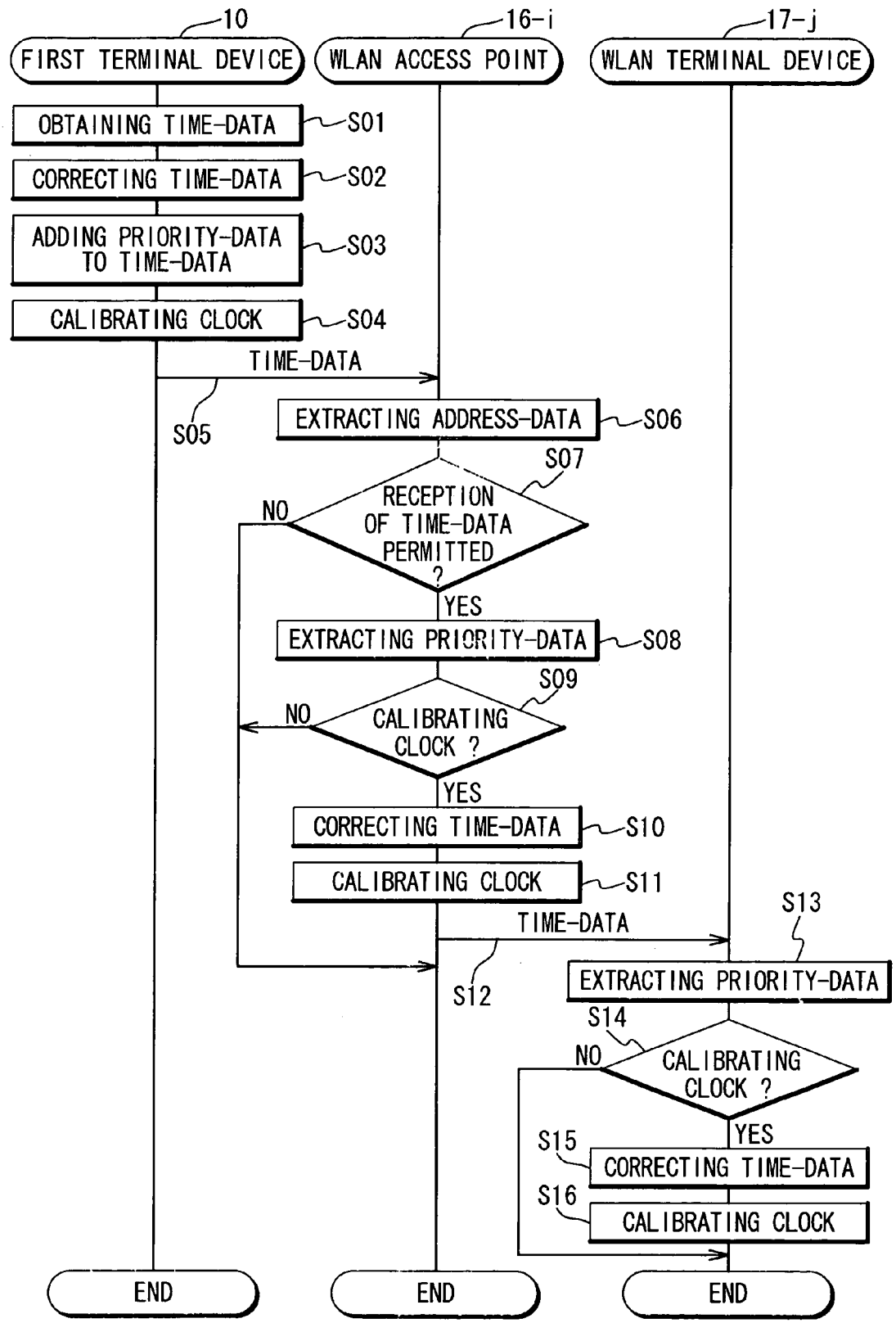

TIME-MATCHING SYSTEM AND TIME-MATCHING METHOD

BACKGROUND OF THE INVENTION

1. Field of the Invention

The present invention relates to a time-matching system and a time-matching method, in particular, to a time-matching system and a time-matching method for wireless communication terminal devices.

2. Description of the Related Art

In a computer network, time-data can be obtained by connecting to an NTP (Network Time Protocol) server. Also., a mobile GPS (Global Positioning System) receiver can obtain time-data from a GPS satellite which provides the time-data (referred to as satellite time-data) as well as position-data. Such satellite time-data has higher accuracy than time-data provided by an NTP server. A terminal device with a GPS receiver (or a terminal device connected to a GPS receiver) can obtain satellite time-data, and hence a clock within the terminal device can be calibrated by reference to the satellite time-data. However, the satellite time-data can not be shared between the terminal device and terminal devices with no GPS receiver (or terminal devices not connected to a GPS receiver).

A technology is desired, with which time-data with high accuracy can be shared between a terminal device having the time-data and other terminal devices on a wireless communication network (for example, a wireless Local Area Network).

Japanese Laid Open Patent Application (JP-P-Heisei 10-145845) discloses a mobile communication system. The mobile communication system includes a plurality of base stations, each of which has a GPS receiver. Time-data included in GPS-data received by the GPS receiver is delayed to generate a delayed timing signal. Each base station synchronizes a call signal from a mobile communication device with the delayed timing signal. Therefore, the synchronization between the plurality of base stations is achieved without presetting the amount of time-delay for each base station.

Japanese Laid Open Patent Application (JP-P2000-278746A) discloses a communication system. According to the communication system, a communication device receives a GPS synchronization signal from a CDMA (Code Division Multiple Access) network, and transmits a synchronization signal to a PHS (Personal Handy-phone System) network in synchronization with the GPS synchronization signal. Then, the system clock in the PHS network is corrected based on the received synchronization signal.

Japanese Laid Open Patent Application (JP-P2002-156477A) discloses a time correcting system. The time correcting system connected to a network includes a communication device having a receiving unit and a transmitting unit. Here, the receiving unit receives time-data to which a reliability parameter is added. The communication device generates new time-data by adding a reliability parameter of its own to the received time-data having the reliability parameter. Then, the communication device transmits the new time-data via the above-mentioned network.

The communication device further includes a time generating unit, a time-data extracting unit, a time-data comparing unit and a time correcting unit. The time generating unit generates own time-data. The time-data extracting unit extracts time-data having a reliability parameter from the data received by the receiving unit. The time-data comparing unit compares the own time-data generated by the time generating unit with the time-data having the reliability parameter extracted by the time-data extracting unit. The time correcting unit controls the time generating unit based on the result of comparison provided by the time-data comparing unit.

An object of the time correcting system mentioned above is to adjust automatically the clock build in each communication device on the network without concentrating the load on a certain communication device.

Japanese Laid Open Patent Application (JP-P2000-314771A) discloses a GPS-based information system. The GPS-based information system is composed of a plurality of GPS-based information transmitting stations and a plurality of information receiving terminals. Each of the plurality of GPS-based information transmitting stations includes a GPS antenna, a GPS receiver and a transmitter.

The GPS antenna receives radio waves from GPS satellites. The GPS receiver receives GPS-data from the GPS antenna and outputs position-data and time-data to the transmitter. The transmitter transmits the position-data and the time-data to the plurality of information receiving terminals.

An object of the GPS-based information system mentioned above is to reduce the electrical power consumption of each terminal by reducing the amount of calculation for detecting its location. Another object is to manage the users' security and locations by utilizing the wireless LAN communication.

SUMMARY OF THE INVENTION

Therefore, an object of the present invention is to provide a time-matching system and a time-matching method with which a time-data with high accuracy in a certain terminal device can be shared with other terminal devices on a wireless communication network.

Another object of the present invention is to provide a time-matching system and a time-matching method with which a time-data with high accuracy provided by GPS satellites can be shared between a plurality of terminal devices on a wireless communication network.

Still another object of the present invention is to provide a time-matching system and a time-matching method which can automatically correct clocks of a plurality of terminal devices on a wireless communication network.

Still another object of the present invention is to provide a time-matching system and a time-matching method with which each of a plurality of terminal devices can make its own clock accurate enough to be consistent with satellite time-data from GPS satellites without using a GPS receiver.

In an aspect of the present invention, a time-matching system includes a first terminal device capable of receiving a GPS (Global Positioning System) data from a GPS satellite and a communications relay device relaying communications between the first terminal device and a second terminal device on a wireless communications network.

The first terminal device executes a first correction procedure on a satellite time-data in the GPS data to generate a first time-data, and transmits the first time-data to the communications relay device. The first correction procedure is executed based on a time delay in communications between the GPS satellite and the first terminal device. Also, the first terminal device adds to the first time-data a priority-data indicative of reliability of the first time-data in the first correction procedure.

The communications relay device receives the first time-data, executes an intermediate correction procedure on the first time-data to generate an intermediate time-data, and transmits the intermediate time-data to the second terminal device. The intermediate correction procedure is executed based on a time delay in communications between the first terminal device and the communications relay device. Also, the communications relay device adds to the intermediate time-data the priority-data in the intermediate correction procedure.

The communications relay device determines whether the reception of the first time-data is permitted or not based on an address of the first terminal device. Also, the communications relay device determines whether the intermediate correction procedure is permitted or not based on the priority-data.

The second terminal device receives the intermediate time-data, determines whether a second correction procedure is permitted or not based on the priority-data, executes the second correction procedure on the intermediate time-data to generate a second time-data. The second correction procedure is executed based on a time delay in communications between the communications relay device and the second terminal device. Then, the second terminal calibrates a clock of the second terminal device based on the second time-data.

In another aspect of the present invention, a first terminal device includes a GPS receiver and a data processing device. The GPS receiver receives a GPS-data from a GPS satellite and outputs the GPS-data to the data processing device. The data processing device is connected to the GPS receiver and receives the GPS-data.

The data processing device extracts a satellite time-data from the GPS-data, executes a first correction procedure on the satellite time-data to generate a corrected time-data (a first time-data). The correction procedure is executed based on a time delay in communications between the GPS satellite and the GPS receiver. The data processing device adds to the first time-data a priority-data indicative of reliability of the first time-data, and transmits the first time-data to a destination on a wireless communication network.

A communications relay device relays wireless communications between the first terminal device and a second terminal device. The communications relay device includes a priority comparing unit, a delay calculating unit, a clock, and a time setting unit.

The priority comparing unit determines whether reception of the first time-data is permitted or not based on an address of the first terminal device. Then, the priority comparing unit receives the first time-data from the first terminal device and permits an intermediate correction procedure on the first time-data based on the priority-data. The delay calculating unit executes the intermediate correction procedure on the first time-data to generate an intermediate time-data. The intermediate correction procedure is executed based on a time delay in communications between the first terminal device and the delay calculating unit. The time setting unit calibrates the clock based on the intermediate time-data. The intermediate time-data is transmitted to the second terminal device.

The second terminal device includes a priority comparing unit, a delay calculating unit, a clock, and a time setting unit. The priority comparing unit receives the intermediate time-data from the wireless communications relay device and permits a second correction procedure on the intermediate time-data based on the priority-data. The delay calculating unit executes the second correction procedure on the intermediate time-data to generate a corrected time-data (second time-data). The correction procedure is executed based on a time delay in communications between the wireless communications relay device and the delay calculating unit. The time setting unit calibrates the clock based on the second time-data.

In still another aspect of the present invention, a time-matching method includes the steps of: (a) a first terminal device generating a first time-data by executing a first correction procedure on a satellite time-data received from a GPS satellite, the first correction procedure being based on a time delay in communications between the GPS-satellite and the first terminal device; (b) the first terminal device calibrating a clock of the first terminal device based on the first time-data; (c) the first terminal device transmitting the first time-data wirelessly to a communications relay device; (d) the communications relay device receiving the first time-data and generating an intermediate time-data by executing an intermediate correction procedure on the first time-data, the intermediate correction procedure being based on a time delay in communications between the first terminal device and the communications relay device; and (e) the communications relay device transmitting the intermediate time-data to a second terminal device different from the first terminal device.

The (a) generating step includes (a1) adding to the first time-data a priority-data indicative of reliability of the first time-data in the first correction procedure. The (d) receiving and executing step includes: (d1) the communications relay device determining whether reception of the first time-data is permitted or not based on an address of the first terminal device; and (d2) the communications relay device determining whether the intermediate correction procedure is permitted or not based on the priority-data.

The time-matching method further includes: (f) the second terminal device receiving the intermediate time-data and generating a second time-data by executing a second correction procedure on the intermediate time-data, the second correction procedure being based on a time delay in communications between the communications relay device and the second terminal device; and (g) the second terminal device calibrating a clock of the second terminal device based on the second time-data. The (f) generating step includes (f1) determining whether the second correction procedure is permitted or not based on the priority-data.

It should be noted that the order of the steps in the above-mentioned time-matching method can be changed to the extent that consistency is maintained.

According to the present invention, as described above, a time-data with high accuracy provided by GPS satellites can be shared between a plurality of wireless terminal devices on a wireless communication network. Also, a user of a wireless terminal device without a GPS receiver can correct the clock of the own wireless terminal device by receiving time-data from a user of a wireless terminal device having a GPS receiver without mounting a GPS receiver on the own wireless LAN terminal device. Thus, the clocks of the plurality of wireless terminal devices on a wireless communication network can be corrected automatically.

BRIEF DESCRIPTION OF THE DRAWINGS

FIG. 2 shows contents of the MAC table; and

FIG. 3 is a flow chart showing a time-matching method according to the time-matching system of the present invention.

DESCRIPTION OF THE PREFERRED EMBODIMENTS

Figure 1:
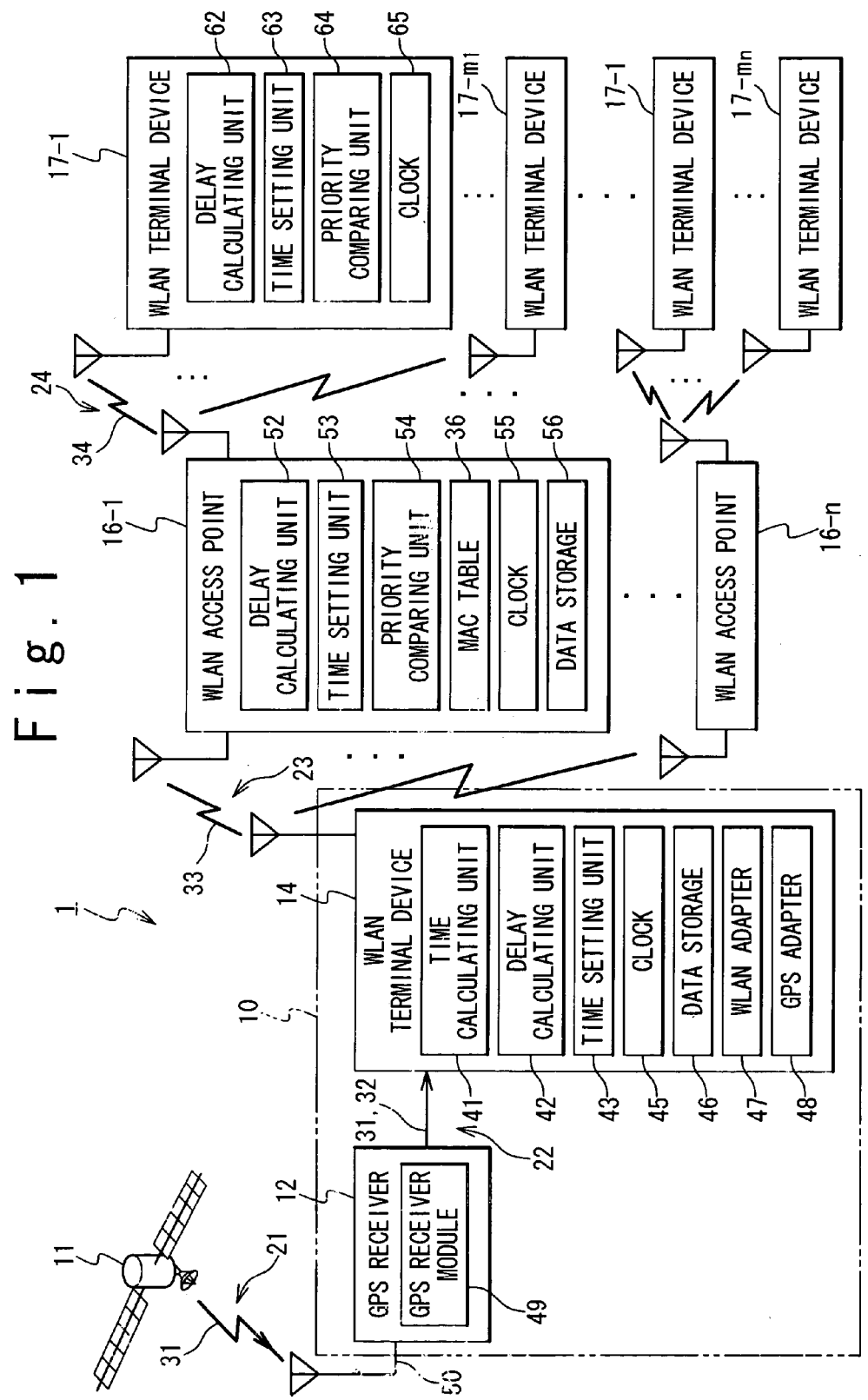
FIG. 1 shows a configuration of a time-matching system according to an embodiment of the present invention.

Embodiments of the present invention will be described below with reference to the attached drawings. A time-matching system according to the present invention utilizes a wireless network. A wireless LAN (Local Area Network) exemplifies the wireless network.

FIG. 1 shows a configuration of a time-matching system according to the embodiment of the present invention. A time-matching system 1 includes a GPS-based terminal device 10 and a plurality of wireless LAN (WLAN; Wireless Local Area Network) access points 16-i (i is an integer more than or equal to 1 and less than or equal to n, wherein n is a number of the wireless LAN access points). The GPS-based terminal device 10 and each of the plurality of wireless LAN access points 16-i are connected with each other via a wireless LAN (WLAN) link 23 to establish two-way communication.

Each of the plurality of wireless LAN access points 16-i is connected to a plurality of wireless LAN (WLAN) terminal devices 17-j (j is an integer more than or equal to 1 and less than or equal to $m_i$, wherein $m_i$ is a number of the wireless LAN terminal devices connected to a wireless LAN access point 16-i) via a wireless LAN link 24 to establish two-way communication.

Each of the wireless LAN links 23, 24 constructs a Local Area Network without cable lines by using radio waves and infrared to establish wireless communication. The wireless LAN link 23 and the wireless LAN link 24 may construct an identical Local Area Network. It should be noted that the network in the present invention can be a network other than a LAN.

A GPS (Global Positioning System) satellite 11 transmits data including time-data and position-data by radio waves. The data and the time-data provided by the GPS satellite 11 are referred to as a GPS-data 31 and a satellite time-data 32, respectively. The time-matching system 1 is capable of receiving the GPS-data 31 from the GPS satellite 11 via a satellite link 21.

The GPS-based terminal device (first terminal device) 10 has a GPS receiver 12 and a wireless LAN terminal device 14. The GPS receiver 12 detects the radio waves transmitted by the GPS satellite 11, and outputs the GPS-data 31 including the satellite time-data 32 to the wireless LAN terminal device 14. The wireless LAN terminal device 14 executes a first correction procedure on the satellite time-data 32 to generate a first time-data 33. Also, the wireless LAN terminal device 14 calibrates its own clock based on the first time-data 33.

More specifically, the GPS receiver 12 has a GPS receiver module 49 and a GPS antenna 50. The GPS receiver module 49 detects the radio waves from the GPS satellite 11 by using the GPS antenna 50. Next, the GPS receiver module 49 extracts the GPS-data 31 from the detected radio waves. Then, the GPS receiver module 49 outputs the GPS-data 31 including the satellite time-data 32 to the wireless LAN terminal device 14 through an internal line 22. The GPS receiver 12 may be built in the GPS-based terminal device 10 or may be configured to be detachable to the GPS-based terminal device 10. Also, the GPS receiver 12 may be mobile and connected to the wireless LAN terminal device 14 via a communication cable.

The wireless LAN terminal device 14 is a data processing device such as a personal computer. The wireless LAN terminal device 14 includes a time calculating unit 41, a delay calculating unit 42, a time setting unit 43, a clock 45, a data storage 46, a wireless LAN adapter 47 and a GPS adapter 48. Here, the wireless LAN terminal device 14 can be provided specially as a device for obtaining the satellite time-data 32. Alternatively, the wireless LAN terminal device 14 can be in the same position as an after-mentioned wireless LAN terminal device 17-j on the network except that the wireless LAN terminal device 14 is connected to the GPS receiver 12.

The GPS adapter 48 receives the GPS-data 31 including the satellite time-data 32 from the GPS receiver 12.

The clock 45 is a clock in the wireless LAN terminal device 14.

The delay calculating unit 42 calculates delay time by using a conventional method, and executes a first correction procedure on the satellite time-data 32 based on the calculated delay time to generate a first time-data 33.

The data storage 46 includes a memory unit and stores the GPS-data 31, the first time-data 33 and data of time when the wireless LAN terminal device 14 has received the GPS-data 31 which is determined by the clock 45.

The time calculating unit 41 adds a priority-data to the first time-data 33. Here, the priority-data is defined as an indicator of reliability, i.e., is representative of the source of a time-data. For example, when a time-data is based on the satellite time-data 32, which is most accurate, the priority-data has a value of "1". When a time-data is provided by an NTP (Network Time Protocol) server, which is second most accurate, the priority-data has a value of "2". In the other cases, the priority-data has a value of "3". In the case of the above-mentioned time calculating unit 41, the priority-data of "1" is given to the first time-data 33. An after-mentioned wireless LAN terminal device 17-j may have time-data including priority-data of other than "1".

The time setting unit 43 calibrates the clock 45 based on the first time-data 33, i.e., sets current time-data to the first time-data 33.

The wireless LAN adapter 47 transmits the first time-data 33 to every one of the plurality of wireless LAN access points 16-i via the wireless LAN link 23.

The first correction procedure executed by the delay calculating unit 42 includes (a) calculating the time which the GPS-data 31 has taken to travel between the GPS satellite 11 and the GPS-based terminal device 10 and (b) adding the calculated time (referred to as a delay time ΔT1, hereinafter) to the satellite time-data 32. Thus, the first time-data 33 is generated. It should be noted that if time necessary for processing and transmitting the GPS-data 31 in the GPS-based terminal device 10 is not negligible, such time is also added to the delay time ΔT1 (the satellite time-data 32). The delay time ΔT1 is calculated by using a conventional delay calculating circuit.

Each of the plurality of the wireless LAN access points 16-i is a communications relay station by which communication is relayed on the Local Area Network. Each wireless LAN access point 16-i receives the first time-data 33 from the GPS-based terminal device 10, adjusts the first-time data 33 to generate an intermediate time-data 34 and transmits the intermediate time-data 34 to a device different from the GPS-based terminal device. Each wireless LAN access point 16-i has a delay calculating unit 52, a time setting unit 53, a priority comparing unit 54, a clock 55, a data storage 56 and a MAC (Media Access Control) table 36.

The clock 55 is a clock of the wireless LAN access point 16-i and generates time-data. Also, the clock 55 has a priority-data of the time-data of the wireless LAN access point 16-i.

The MAC table 36 contains address data (MAC addresses) of the wireless LAN adapters 47 of terminal devices (including the GPS-based terminal device 10), each of which is associated with information whether the reception of the first time-data 33 from that MAC address is permitted or not.

The priority comparing unit 54 receives an address data (MAC address) of the wireless LAN adapter 47 of the GPS-based terminal device 10. Based on the MAC address, the priority comparing unit 54 determines whether the reception of the first time-data 33 from the GPS-based terminal device 10 is permitted or not by referring to the MAC table 36. When the reception is permitted, the priority comparing unit 54 compares the priority-data of the first time-data 33 with a priority-data which the clock 55 of the wireless LAN access point 16-i has. If the reliability of the first time-data 33 is equal to or higher than the reliability of the time-data of the clock 55, the priority comparing unit 54 permits an intermediate correction procedure on the first time-data 33.

The delay calculating unit 52 includes a conventional delay calculating circuit. When the intermediate correction procedure is permitted by the priority comparing unit 54, the delay calculating unit 52 executes the intermediate correction procedure on the first time-data 33 to generate the intermediate time-data 34.

The time setting unit 53 calibrates the clock 55 based on the intermediate time-data 34, i.e., sets current time-data to the intermediate time-data 34. Also, the time setting unit 53 updates the priority-data of the clock 55.

The data storage 56 includes a memory unit and stores the first time-data 33, the intermediate time-data 34 and the like. The intermediate time-data 34 is transmitted to each destination in every communication through the wireless LAN access point 16-i.

The intermediate correction procedure executed by the wireless LAN access point 16-i includes (a) calculating the time which the first time-data 33 has taken to travel between the GPS-based terminal device 10 and the wireless LAN access point 16-i on the wireless LAN link 23 and (b) adding the calculated time (referred to as a delay time ΔT2, hereinafter) to the first time-data 33. Thus, the intermediate time-data 34 is generated. It should be noted that if time necessary for processing and transmitting the first time-data 33 in the wireless LAN access point 16-i is not negligible, such time is also added to the delay time ΔT2 (the first time-data 33). The delay time ΔT2 is calculated by using a conventional delay calculating circuit.

The GPS-based terminal device 10 (first terminal device) is connected to each of the plurality of wireless LAN terminal devices 17-j (second terminal device) via the wireless LAN network. Each wireless LAN terminal device 17-j (second terminal device) is a data processing device such as a personal computer. The wireless LAN terminal device 17-j communicates with the corresponding one of the plurality of wireless LAN access points 16-i wirelessly, and receives the intermediate time-data 34 from that wireless LAN access point 16-i. The wireless LAN terminal device 17-j includes a delay calculating unit 62, a time setting unit 63, a priority comparing unit 64 and a clock 65.

The clock 65 is a clock of the wireless LAN terminal device 17-j and generates time-data. Also, the clock 65 has a priority-data of the time-data of the wireless LAN terminal device 17-j.

The priority comparing unit 64 compares the priority-data of the intermediate time-data 34 from the wireless LAN access point 16-i with a priority-data which the clock 65 of the wireless LAN terminal device 17-j has. If the reliability of the intermediate time-data 34 is equal to or higher than the reliability of the time-data of the clock 65, the priority comparing unit 64 permits a second correction procedure on the intermediate time-data 34.

The delay calculating unit 62 includes a conventional delay calculating circuit. When the second correction procedure is permitted by the priority comparing unit 64, the delay calculating unit 62 executes the second correction procedure on the intermediate time-data 34 to generate a second time-data 35.

The time setting unit 63 calibrates the clock 65 based on the second time-data 35, i.e., sets current time-data to the second time-data 35. Also, the time setting unit 63 updates the priority-data of the clock 65.

The second correction procedure executed by the wireless LAN terminal device 17-j includes (a) calculating the time which the intermediate time-data 34 has taken to travel between the wireless LAN access point 16-i and the wireless LAN terminal device 17-j on the wireless LAN link 24 and (b) adding the calculated time (referred to as a delay time ΔT3, hereinafter) to the intermediate time-data 34. Thus, the second time-data 35 is generated. It should be noted that if time necessary for processing and transmitting the intermediate time-data 34 in the wireless LAN terminal device 17-j is not negligible, such time is also added to the delay time ΔT3 (the intermediate time-data 34). The delay time ΔT3 is calculated by using a conventional delay calculating circuit.

FIG. 2 shows contents of the MAC table 36. The MAC table 36 contains MAC addresses of the wireless LAN adapters 47 of terminal devices (including the GPS-based terminal device 10), each of which is associated with information whether the reception of the first time-data 33 from that MAC address is permitted or not. The column 36-2 contains MAC addresses of the wireless LAN adapters 47 of the terminal devices. The column 36-1 indicates whether the reception of the first time-data 33 from the corresponding MAC address is "permitted" or "forbidden".

Next, a time-matching method according to the time-matching system of the present invention will be described below. FIG. 3 is a flow chart showing the time-matching method according to the present embodiment.

(1) Step S01

The radio waves transmitted by the GPS satellite 11 is received by the GPS receiver module 49 of the GPS-based terminal device (first terminal device) 10 through the GPS antenna 50 periodically with an appropriate time interval. Then, the GPS-data 31 including the satellite time-data 32 is extracted from the radio waves. The extracted GPS-data 31 is supplied to the wireless LAN (WLAN) terminal device 14 of the GPS-based terminal device 10 via the internal line 22.

(2) Step S02

The satellite time-data 32 is received by the wireless LAN terminal device 14 through the GPS adapter 48. The wireless LAN terminal device 14 executes the first correction procedure on the satellite time-data 32 to generate the first time-data (3) Step S03

The wireless LAN terminal device 14 adds the priority-data to the first time-data 33.

(4) Step S04

The wireless LAN terminal device 14 calibrates the clock 45 based on the first time-data 33, i.e., sets current time-data to the first time-data 33.

(5) Step S05

The wireless LAN terminal device 14 establishes a connection to a wireless LAN (WLAN) access point 16-i via the wireless LAN link 23 by using the wireless LAN adapter 47. When or after the connection is established, the first time-data 33 with the priority-data is transmitted to the wireless LAN access point 16-i together with data transferred according to a wireless communication protocol.

(6) Step S06

The wireless LAN access point 16-i extracts the address-data (MAC address) of the GPS-based terminal device 10 from the first time-data 33 and the data transferred according to the wireless communication protocol.

(7) Step S07

The MAC address is checked by referring to the MAC table 36 in the wireless LAN access point 16-i. If the MAC address is included in the row "permitted" in the MAC table 36, the reception of the first time-data 33 is permitted. If the MAC address is included in the row "forbidden" in the MAC table 36, the communication process ends.

(8) Step S08

If the reception of the first time-data 33 is permitted, the wireless LAN access point 16-i extracts a priority-data from the first time-data 33.

(9) Step S09

The wireless LAN access point 16-i compares the priority-data of the first time-data 33 with a priority-data which the clock 55 of the wireless LAN access point 16-i has. If the reliability of the first time-data 33 is equal to or higher than the reliability of the time-data of the clock 55, the intermediate correction procedure on the first time-data 33 is permitted. Otherwise, the intermediate correction procedure is not permitted, and the communication process ends.

(10) Step S10

The wireless LAN access point 16-i executes the intermediate correction procedure on the first time-data 33 to generate the intermediate time-data 34.

(11) Step S11

The wireless LAN access point 16-i calibrates the clock 55 based on the intermediate time-data 34, i.e., sets current time-data to the intermediate time-data 34. Also, the priority-data of the clock 55 is updated.

(12) Step S12

The wireless LAN access point 16-i establishes a connection to a wireless LAN (WLAN) terminal device 17-j via the wireless LAN link 24 for delivering the intermediate time-data 34 to the wireless LAN terminal device 17-j periodically with an appropriate time interval. When or after the connection is established, the intermediate time-data 34 with the priority-data is transmitted to the wireless LAN terminal device 17-j together with data transferred according to the wireless communication protocol.

Or, the wireless LAN terminal device 17-j establishes a connection to a wireless LAN access point 16-i via the wireless LAN link 24. When or after the connection is established, the intermediate time-data 34 with the priority-data is transmitted to the wireless LAN terminal device 17-j together with data transferred according to a wireless communication protocol.

(13) Step S13

The wireless LAN terminal device 17-j receives the intermediate time-data 34, and extracts a priority-data from the intermediate time-data 34.

(14) Step S14

The wireless LAN terminal device 17-j compares the priority-data of the intermediate time-data 34 with a priority-data which the clock 65 of the wireless LAN terminal device 17-j has. If the reliability of the intermediate time-data 34 is equal to or higher than the reliability of the time-data of the clock 65, the second correction procedure on the intermediate time-data 34 is permitted. Otherwise, the second correction procedure is not permitted, and the communication process ends.

(15) Step S15

The wireless LAN terminal device 17-j executes the second correction procedure on the intermediate time-data 34 to generate the second time-data 35.

(16) Step S16

The wireless LAN terminal device 17-j calibrates the clock 65 based on the second time-data 35, i.e., sets current time-data to the second time-data 35. Also, the priority-data of the clock 65 is updated.

According to the Steps S01 to S16 mentioned above, it becomes possible to share highly accurate time-data with the plurality of wireless LAN access points 16-i and the plurality of wireless LAN terminal devices 17-j over the wireless LAN network. Here, the highly accurate time-data is obtained by a terminal device (GPS-based terminal device 10) which has a GPS receiver and is capable of receiving satellite time-data from GPS satellites.

In the Step S05 mentioned above, the plurality of the wireless LAN access points 16-i includes all wireless LAN access points over the wireless LAN network. Therefore, a wireless LAN access point 16-i without a GPS receiver can obtain time-data from a user of a wireless LAN terminal device with a GPS receiver. Thus, the wireless LAN access point 16-i can correct the time-data of the plurality of wireless LAN terminal devices 17-j connected to the wireless LAN access point 16-i. It should be noted that the plurality of the wireless LAN access points 16-i can be limited to a part of the wireless LAN access points over the wireless LAN network.

In the Step S12 mentioned above, the plurality of the wireless LAN terminal devices 17-j includes all wireless LAN terminal devices over the wireless LAN network. Therefore, a user of a wireless LAN terminal device without a GPS receiver can obtain time-data from a user of a wireless LAN terminal device with a GPS receiver, and can correct the time-data of a wireless LAN terminal device 17-j. It should be noted that the plurality of the wireless LAN terminal devices 17-j can be limited to a part of the wireless LAN terminal devices connected to the wireless LAN access points 16-i.

It is also possible to execute the above-mentioned processes automatically by using control programs. That is to say, it is possible to calibrate automatically (and periodically) a clock which belongs to each of a plurality of terminal devices over a wireless communication network.

The time-data with high accuracy is delivered to each wireless LAN terminal device 17-j periodically in an appropriate time interval. Therefore, each wireless LAN terminal device 17-j can keep its clock accurate at any time. Moreover, it becomes possible not only to synchronize a clock of a wireless LAN terminal device 17-j with a clock of a wireless LAN access point 16-i but also to easily synchronize clocks of a plurality of wireless LAN terminal devices 17-j to which the time-data is transmitted by the same wireless LAN access point 16-i with each other.

In the above embodiment of the present invention, the clock of each wireless LAN terminal devices 17-j is calibrated by the time-data delivered through a wireless LAN access point 16-i. Here, it is also possible to receive the time-data directly from the wireless LAN terminal device 14 (GPS-based terminal device 10) without the wireless LAN access point 16-i by using pier-to-pier communication. In that case, the Steps S06 to S11 can be omitted from the communication processes.

The GPS-based terminal device 10 can be provided within any of the plurality of wireless LAN access points 16-i. In that case, the Steps S05 to S11 can be omitted from the communication processes, resulting in a prompt generation of the intermediate time-data 34 from the first time-data 33.

The GPS receiver 12 can be provided within the wireless LAN terminal device 14, i.e., the GPS-based terminal device 10 can have an integrated structure. In that case, the treatment of the GPS-based terminal device 10 becomes easier. Also, the GPS receiver 12 can be provided independently of the GPS-based terminal device 10. In that case, one terminal device to be connected to the GPS receiver 12 is selected from a plurality of terminal devices.

Instead of the first time-data 33, the time-data of the clock 45 calibrated based on the first time-data 33 can be transmitted from the wireless LAN terminal device 14 to a wireless LAN access point 16-i. Similarly, instead of the intermediate time-data 34, the time-data of the clock 55 calibrated based on the intermediate time-data 34 can be transmitted from a wireless LAN access point 16-i to a wireless LAN terminal device 17-j. Also in those cases, the same result as in the case mentioned above can be obtained.

According to the present invention, as described above, a user of a wireless LAN terminal device with a GPS receiver can correct the clock of the own wireless LAN terminal device by receiving satellite time-data from GPS satellites. Furthermore, a user of a wireless LAN terminal device without a GPS receiver can correct the clock of the own wireless LAN terminal device by receiving time-data from a user of a wireless LAN terminal device having a GPS receiver without mounting a GPS receiver on the own wireless LAN terminal device.

It will be obvious to one skilled in the art that the present invention may be practiced in other embodiments that depart from the above-described specific details. The scope of the present invention, therefore, should be determined by the following claims.

What is claimed is:

1. A time-matching system comprising:
    a first terminal device receiving a GPS (Global Positioning System) data from a GPS satellite; and
    a communications relay device relaying communications between said first terminal device and a second terminal device on a wireless communications network,
    wherein said first terminal device executes a first correction procedure on a satellite time-data of said GPS data to generate a first time-data, and transmits said first time-data to said communications relay device,
    said first correction procedure being based on a time delay in communications between said GPS satellite and said first terminal device,
    wherein said communications relay device receives said first time-data, executes an intermediate correction procedure on said first time-data to generate an intermediate time-data, and transmits said intermediate time-data to said second terminal device, and
    said intermediate correction procedure being based on a time delay in communications between said first terminal device and said communications relay device.

2. The time-matching system according to claim 1, wherein said first terminal device adds to said first time-data, a priority-data indicative of reliability of said first time-data in said first correction procedure, and
    said communications relay device determines whether reception of said first time-data is permitted or not based on an address of said first terminal device, and determines whether said intermediate correction procedure is permitted or not based on said priority-data.

3. The time-matching system according to claim 2, wherein said communications relay device adds to said intermediate time-data, said priority-data in said intermediate correction procedure, and
    said second terminal device receives said intermediate time-data, determines whether a second correction procedure is permitted or not based on said priority-data, executes said second correction procedure on said intermediate time-data to generate a second time-data, and calibrates a clock of said second terminal device based on said second time-data,
    said second correction procedure being based on a time delay in communications between said communications relay device and said second terminal device.

4. A terminal device comprising:
    a GPS receiver receiving a GPS-data from a GPS satellite and outputting said GPS-data;
    a data processing device connected to said GPS receiver and receiving said GPS-data from said GPS-receiver,
    wherein said data processing device extracts a satellite time-data from said GPS-data, executes a correction procedure on said satellite time-data to generate a corrected time-data, and transmits said corrected time-data to a destination on a wireless communication network,
    said correction procedure being based on a time delay in communications between said GPS satellite and said GPS receiver,
    wherein said data processing device adds to said corrected time-data, a priority-data indicative of reliability of said corrected time-data, and transmits said corrected time-data to said destination and
    wherein, based on the reliability indicated by the priority-data, the destination executes an intermediate correction procedure.

5. A communications relay device relaying wireless communications between a first terminal device and a second terminal device, in which said first terminal device receives a GPS-data from a GPS-satellite, and generates from said GPS-data a first time-data including a priority-data indicative of reliability of said first time-data, comprising:
    a priority comparing unit receiving said first time-data from said first terminal device and permitting an intermediate correction procedure on said first time-data based on said priority-data;
    a delay calculating unit executing said intermediate correction procedure on said first time-data to generate an intermediate time-data, said intermediate correction procedure being based on a time delay in communications between said first terminal device and said delay calculating unit;
    a clock; and
    a time setting unit calibrating said clock based on said intermediate time-data,
    wherein said intermediate time-data is transmitted to said second terminal device.

6. The communications relay device according to claim 5, wherein said priority comparing unit determines whether reception of said first time-data is permitted or not based on an address of said first terminal device, and determines whether said intermediate correction procedure is permitted or not based on said priority-data.

7. A terminal device communicating with another terminal device through a wireless communications relay device which executes an intermediate correction procedure on a satellite time-data provided by a GPS satellite to generate an intermediate time-data including a priority-data indicative of reliability of said intermediate time-data, comprising:
- a priority comparing unit receiving said intermediate time-data from said wireless communications relay device and permitting a correction procedure on said intermediate time-data based on said priority-data;
- a delay calculating unit executing said correction procedure on said intermediate time-data to generate a corrected time-data, said correction procedure being based on a time delay in communications between said wireless communications relay device and said delay calculating unit;
- a clock; and
- a time setting unit calibrating said clock based on said corrected time-data.

8. A time-matching method comprising:
- (a) generating, by a first terminal device, a first time-data by executing a first correction procedure on a satellite time-data received from a GPS satellite, said first correction procedure being based on a time delay in communications between the GPS-satellite and the first terminal device;
- (b) calibrating, by the first terminal device, a clock of the first terminal device based on the first time-data;
- (c) transmitting, by the first terminal device, the first time-data wirelessly to a communications relay device;
- (d) receiving, by the communications relay device, the first time-data and generating an intermediate time-data by executing an intermediate correction procedure on the first time-data, said intermediate correction procedure being based on a time delay in communications between the first terminal device and the communications relay device; and
- (e) transmitting, by the communications relay device, the intermediate time-data to a second terminal device different from the first terminal device.

9. The time-matching method according to claim 8, wherein said (a) generating includes:
- (a1) adding to said first time-data a priority-data indicative of reliability of the first time-data in said first correction procedure, wherein said (d) receiving and executing includes:
- (d1) determining, by the communications relay device, whether or not reception of the first time-data is permitted based on an address of the first terminal device; and
- (d2) determining, by the communications relay device, whether or not the intermediate correction procedure is permitted based on the priority-data.

10. The time-matching method according to claim 8 further comprising:
- (f) receiving, by the second terminal device, the intermediate time-data and generating a second time-data by executing a second correction procedure on the intermediate time-data, said second correction procedure being based on a time delay in communications between the communications relay device and the second terminal device; and
- (g) calibrating, by the second terminal device, a clock of the second terminal device based on the second time-data.

11. The time-matching method according to claim 10, wherein said (f) generating includes (f1) determining whether said second correction procedure is permitted or not based on the priority-data.

\* \* \* \* \*